(12) United States Patent
Beck

(10) Patent No.: US 11,009,148 B2
(45) Date of Patent: May 18, 2021

(54) DISPLACEMENT TRANSDUCER

(71) Applicant: Robert Bosch GmbH, Stuttgart (DE)

(72) Inventor: Thorsten Beck, Graefendorf (DE)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 16/455,021

(22) Filed: Jun. 27, 2019

(65) Prior Publication Data

US 2020/0003331 A1     Jan. 2, 2020

(30) Foreign Application Priority Data

Jun. 29, 2018    (DE) ................... 10 2018 210 704.1

(51) Int. Cl.
| | |
|---|---|
| *F16K 37/00* | (2006.01) |
| *H01F 29/10* | (2006.01) |
| *G01P 3/42* | (2006.01) |
| *G01D 5/20* | (2006.01) |

(52) U.S. Cl.
CPC ....... *F16K 37/0041* (2013.01); *G01D 5/2013* (2013.01); *G01P 3/42* (2013.01); *H01F 29/10* (2013.01)

(58) Field of Classification Search
CPC ..... F16K 37/0041; G01D 5/2013; G01P 3/42; H01F 29/10
See application file for complete search history.

(56) References Cited

U.S. PATENT DOCUMENTS

| | | | | |
|---|---|---|---|---|
| 3,371,684 A | * | 3/1968 | Tissot-Dupont | H01F 7/1638 137/595 |
| 3,828,556 A | * | 8/1974 | Nolden | F15B 21/087 60/432 |
| 4,341,241 A | * | 7/1982 | Baker | F16K 37/0041 137/554 |
| 4,556,886 A | * | 12/1985 | Shimizu | G01D 5/243 324/166 |
| 4,644,355 A | * | 2/1987 | Russell | G01D 5/206 251/129.01 |
| 4,809,742 A | * | 3/1989 | Grau | G01B 7/003 137/554 |
| 4,813,390 A | * | 3/1989 | Bennett | F02M 21/04 123/577 |
| 5,109,675 A | * | 5/1992 | Hwang | G05B 9/02 60/660 |

(Continued)

*Primary Examiner* — Patrick Assouad
*Assistant Examiner* — Demetrius R Pretlow
(74) *Attorney, Agent, or Firm* — Maginot, Moore & Beck LLP

(57) ABSTRACT

A displacement transducer for a valve in a housing includes a cylindrical displacement transducer core, a coil, a coil housing, and a compensation element. The coil is positioned in the coil housing, and radially encloses the core. The coil housing has a first side supported by the housing, and a supporting face positioned between the first side and an axial end side of the coil housing facing away from the valve such that a length change of the coil is not limited in an axial direction facing away from the valve. The housing is axially supported on the compensation element via the supporting face. A side of the compensation element facing away from the valve is supported on one or more of (i) an adjustable cover, (ii) a standard component of a supporting chain of the core, and (iii) a component formed from a material with a suitable coefficient of thermal expansion.

15 Claims, 1 Drawing Sheet

(56) References Cited

U.S. PATENT DOCUMENTS

| | | | | |
|---|---|---|---|---|
| 5,150,049 A * | 9/1992 | Schuetz | F15B 15/2892 | 324/207.12 |
| 5,172,298 A * | 12/1992 | Shimizu | F02D 35/0007 | 324/207.16 |
| 5,493,217 A * | 2/1996 | Stahl | G01P 1/026 | 324/173 |
| 5,600,220 A * | 2/1997 | Thoraval | B64C 13/42 | 318/562 |
| 6,059,538 A * | 5/2000 | Kawaguchi | F04B 27/1804 | 417/222.2 |
| 6,329,728 B1 * | 12/2001 | Kitazawa | H02K 41/03 | 310/14 |
| 6,354,563 B1 * | 3/2002 | Yoeda | F01L 9/20 | 251/129.04 |
| 6,536,266 B1 * | 3/2003 | Akimoto | G01M 15/042 | 73/114.01 |
| 6,604,057 B1 * | 8/2003 | Eden | G01D 3/022 | 702/104 |
| 6,666,784 B1 * | 12/2003 | Iwamoto | F01L 1/024 | 137/554 |
| 7,528,564 B2 * | 5/2009 | Maldener | H02K 15/00 | 318/539 |
| 2002/0030486 A1 * | 3/2002 | Kim | G01B 7/001 | 324/207.18 |
| 2002/0050898 A1 * | 5/2002 | Olsson | H01F 7/1844 | 335/220 |
| 2003/0006761 A1 * | 1/2003 | Hiramatsu | G01D 5/2291 | 324/207.16 |
| 2005/0040815 A1 * | 2/2005 | Jagiella | F15B 15/2861 | 324/207.15 |
| 2005/0268721 A1 * | 12/2005 | Rudkin | G01L 9/0008 | 73/702 |
| 2006/0164075 A1 * | 7/2006 | Niwa | G01D 3/0365 | 324/207.16 |
| 2007/0158947 A1 * | 7/2007 | Annen | F02B 71/04 | 290/1 R |
| 2009/0236551 A1 * | 9/2009 | Nomichi | F16K 37/005 | 251/129.15 |
| 2010/0117630 A1 * | 5/2010 | Asahara | G01D 5/2013 | 324/207.15 |
| 2011/0234210 A1 * | 9/2011 | Hayashi | H01F 7/1844 | 324/207.15 |
| 2012/0313020 A1 * | 12/2012 | Battlogg | F16K 31/0675 | 251/65 |
| 2014/0174564 A1 * | 6/2014 | Maichl | F16K 31/124 | 137/489.5 |
| 2015/0219433 A1 * | 8/2015 | Kato | G01D 5/145 | 324/207.13 |
| 2017/0219118 A1 * | 8/2017 | Army | B64D 13/04 | |
| 2019/0063213 A1 * | 2/2019 | Donderici | E21B 34/14 | |
| 2019/0379268 A1 * | 12/2019 | Adams | H02K 41/0358 | |
| 2020/0212753 A1 * | 7/2020 | Okuhata | H02K 11/215 | |
| 2020/0224785 A1 * | 7/2020 | Harris | F16K 31/047 | |

* cited by examiner

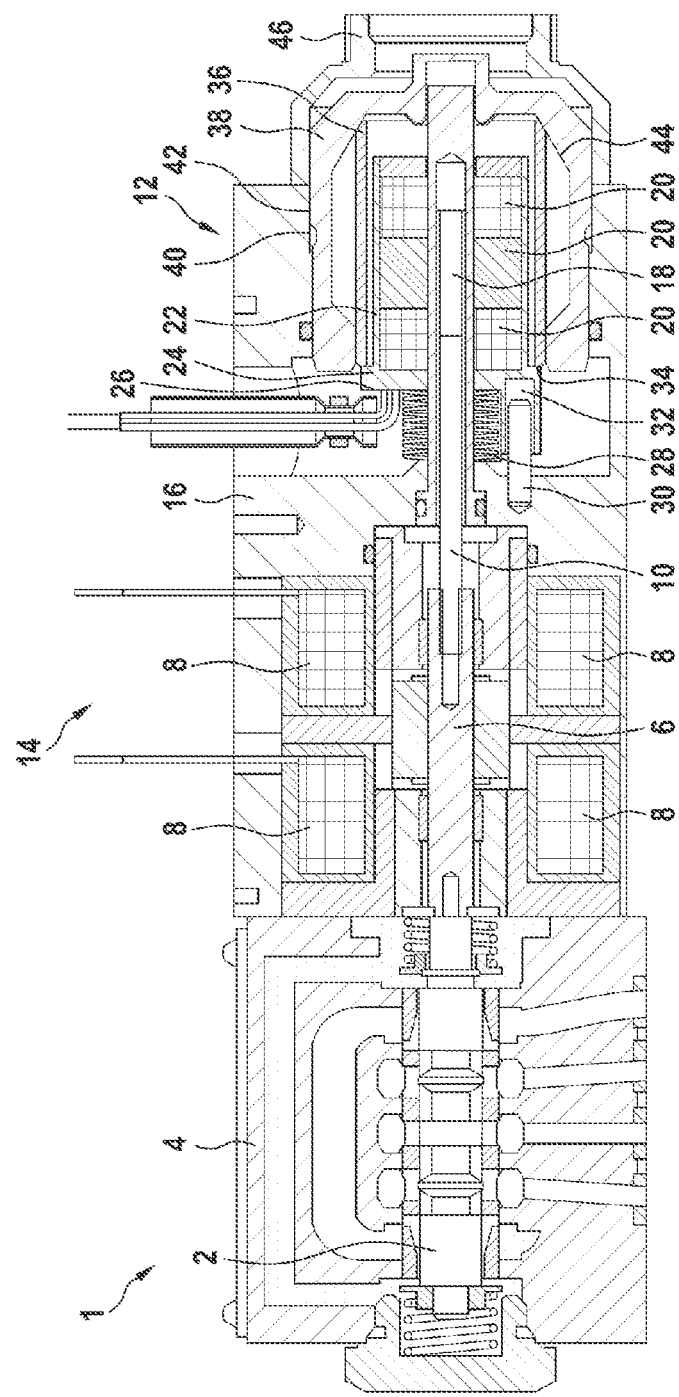

DISPLACEMENT TRANSDUCER

This application claims priority under 35 U.S.C. § 119 to patent application no. DE 10 2018 210 704.1, filed on Jun. 29, 2018 in Germany, the disclosure of which is incorporated herein by reference in its entirety.

The disclosure relates to a displacement transducer. Furthermore, the disclosure relates to a valve for a displacement transducer.

BACKGROUND

Displacement transducers are used to determine displacement travels of components, for example of a valve slide of a steplessly adjustable hydraulic slide valve. To this end, the displacement transducer has a displacement transducer core which can be connected to the component which is to be measured, and has, moreover, a coil system, for example with three coils, two secondary coils and one primary coil. The secondary coils are connected inversely in series, and the added resulting voltages therefore add up to zero as long as the center of the displacement transducer core is arranged axially in the center of the coil system. By way of a movement of the displacement transducer core, the added resulting voltages of the secondary coils do not equal zero, and the displacement travel and also the speed and the position of the component are therefore determined. In order for it to be possible for the displacement travel to be determined in a very accurate manner, the position of the displacement transducer core in the coil has to be established in a very accurate manner. As a result of a temperature change, it can occur that components expand to a different extent. This is owing to the construction and selection of the materials, since the materials for various components cannot be selected freely as a result of technically induced boundary conditions. The different components thus have different coefficients of thermal expansion, with the result that it is possible that, for example, the supporting chain of the displacement transducer core, having a core rod, which receives the displacement transducer core, and the component to be measured, expands more rapidly than the supporting chain of the displacement transducer coil; for example, a housing of the displacement transducer belongs to the latter. An offset between the displacement transducer core and the displacement transducer coil is thus produced, which offset is temperature-dependent. This is also called temperature drift.

In order to reduce the temperature drift, that is to say the different length change of the supporting chain of the displacement transducer core and the supporting chain of the displacement transducer coil, DE 10 2016 216 609 A1 provides the possibility of positioning the displacement transducer coil in a coil housing by way of two springs in the housing. Here, on the side which faces the component to be measured, the coil housing is supported via a spring on the housing, and, on the other side which faces away from the component to be measured, the coil housing is supported via a spring on an adjustable cover. By way of the springs, the length and/or the arrangement of the supporting chain of the housing can be changed simply, and therefore the temperature drift can be influenced or reduced.

SUMMARY

In contrast, the disclosure is based on the object of providing a displacement transducer and a valve having a displacement transducer, in the case of which a temperature drift can be set and/or is avoided or is avoided as far as possible in a simple and inexpensive way in terms of apparatus technology.

Said object is achieved with regard to the displacement transducer in accordance with the description, drawings, and claims.

According to the disclosure, a displacement transducer, in particular a linear displacement transducer, is provided for a valve, in particular a hydraulic directional valve. Here, the displacement transducer is arranged in preferably one housing and has a displacement transducer core which is, in particular, cylindrical. The displacement transducer core can be connected, for example, to a valve slide, in order to determine its displacement travel and/or position and/or speed. The displacement transducer core is assigned at least one coil which is, in particular, hollow-cylindrical, encloses the displacement transducer core radially, and is arranged in a coil housing which is, in particular, likewise approximately hollow-cylindrical. The coil housing has a first housing side which faces the valve slide and the valve, that is to say points in a direction which faces the valve, and via which the coil housing is supported, in particular axially, on the housing. On the side which faces away from the valve, the coil housing has a further supporting face, in particular for axial support. Said supporting face which points away from the valve slide and the valve, that is to say points in a direction which faces away from the valve, is arranged between the first housing side of the coil housing and an axial end section of the coil on the side which faces away from the valve. In other words, the supporting face is positioned in the axial direction in such a way that it does not project beyond the axial coil end in the direction which faces away from the valve. Therefore, in other words, the supporting face is arranged between two axial end sections of the coil, in order to support the coil housing axially. Furthermore, the coil and the coil housing are arranged in such a way that they can increase or decrease in length substantially freely in the axial direction, in particular in the axial direction after the supporting face, in the direction which faces away from the valve, owing to the thermal expansion in the case of a temperature change. The coil housing is supported by way of the supporting face via a compensation element on an adjustable cover of the housing. This means that the compensation element is supported axially on the housing cover on the side which faces away from the valve, and the coil housing is supported axially via the supporting face on the compensation element on the side which faces away from the valve. An advantage of the displacement transducer which has a compensation component is that the compensation component does not have to have any technical properties, such as magnetism, if the coil is shielded, with the result that a material can be selected which has a coefficient of thermal expansion which influences, in particular reduces, a length change of the supporting chain of the coil in a targeted manner. This means that an absolute thermal expansion in the axial direction of the supporting chain of the coil can be set, in particular reduced, in a targeted manner by way of the selection of the material and the length of the compensation element. The aim of the arrangement is to synchronize the expansion of the supporting chain of the coil and the expansion of the supporting chain of the displacement transducer core with regard to the thermal expansion. Furthermore, it is possible by way of the compensation element that the coil and/or the coil housing expand/expands axially in the direction which faces away from the valve in the case of a temperature increase. The coil and/or the coil housing increase/increases in length in the same direction in the case of a temperature change as the adjustable cover. In other words, the coil and/or the coil housing increase/increases in length in the same direction as the adjustable cover, since the supporting face, via which the coil housing is supported on the compensation element, is situated between the first housing side and an end side of the coil housing and/or the coil, which end side faces away from the valve. If the length change of the coil and/or the coil housing is to take place, in particular, substantially in the axial direction which faces away from the valve in the case of a temperature rise, it is advantageous that the supporting face is situated in a region which is situated between the first housing side of the coil housing and the center of the coil. The closer the supporting face is arranged to an end side of the coil which faces the valve, the more pronounced is the increase in length in the direction which faces away from the valve in the case of a temperature increase. By way of a targeted arrangement of the supporting face, the direction of the length change and/or the magnitude of the length change in one direction can be influenced. In addition, the compensation element can be integrated simply in terms of apparatus technology into the arrangement of the displacement transducer.

An alternative or additional possibility for reducing or avoiding the temperature drift would be to provide a displacement transducer which has at least one component in a supporting chain of the coil or in a supporting chain of the displacement transducer core, which at least one component is a standard component which is produced from a material with a suitable coefficient of thermal expansion, in particular a comparatively small coefficient of thermal expansion. For example, the supporting chain of the coil has a housing and a coil housing, and the supporting chain of the displacement transducer core advantageously has a core rod which holds the displacement transducer core, a valve slide and a magnetic plunger which can be moved axially by way of a magnetic field. The provision of a displacement transducer with a standard component which has a suitable coefficient of thermal expansion has the advantage that the length change of the supporting chains can be influenced without it being necessary for the construction of the displacement transducer to be changed. This means that a change of the construction of the housing also does not have to be performed. This is particularly inexpensive. Furthermore, it is possible to influence the temperature drift in a targeted manner by way of the replacement of various standard components which have a different length and therefore also a different absolute axial length change in the case of a temperature change.

The standard component is preferably made from a material, the coefficient of thermal expansion of which is smaller than 100%, in particular smaller than 50% or 20%, of the component which has the next smallest coefficient of thermal expansion in the supporting chain of the displacement transducer and the coil. For example, the component which is, for example, the valve slide and which has, for example, the next smallest coefficient of thermal expansion can have a coefficient of thermal expansion of approximately $11 \times 10^{-6}$ 1/K in the use temperature range, and the standard component, for example a core rod which receives the displacement transducer core, can be made, for example, from Invar and can have a coefficient of thermal expansion of, for example, approximately $1.4 \times 10^{-6}$ 1/K in the use temperature range.

The compensation element preferably has a comparatively small coefficient of thermal expansion. In particular, the coefficient of thermal expansion is smaller than 100%, in particular 50% or 20%, of the component which has the next smallest coefficient of thermal expansion in the supporting chain of the displacement transducer and the coil. The compensation element can be configured, for example, at least partially or completely from Invar which has a comparatively small coefficient of thermal expansion in certain temperature ranges. For example, components of the supporting chain can be made from materials such as nickel/iron alloy and/or cast iron and/or steel which have a coefficient of thermal expansion of, for example, from $10 \times 10^{-6}$ 1/K to $16 \times 10^{-6}$ 1/K in the use temperature range, and the compensation element which consists, for example, of Invar has, for example, a coefficient of thermal expansion of approximately $1.4 \times 10^{-6}$ 1/K in said temperature range. In this example, in the use temperature range, the compensation element made from Invar has a coefficient of thermal expansion of 14% of the component which has the next smallest coefficient of thermal expansion. In this way, the compensation element can have a small length change in the case of a temperature change, and a satisfactory adjustability of the temperature drift can therefore be achieved. In particular, it can be achieved that the length change in the axial direction of the adjustable cover and the length change of the coil housing and/or the coil are added approximately. In other words, the supporting chain of the coil is extended by way of the compensation element which increases in length in the direction which faces the valve in the case of a temperature increase. Since, however, the coefficient of thermal expansion and therefore also the increase in length of the compensation element in the case of a temperature increase is very low in comparison with the increase in length of the housing and/or the coil housing and/or the adjustable cover, the supporting chain of the coil increases in length in the direction which faces away from the valve.

The standard component is preferably produced at least partially or completely from Invar. Invar is an iron/nickel alloy with a very small coefficient of thermal expansion. It consists of 64% iron and 36% nickel.

Invar has the property of having abnormally small or partially negative coefficients of thermal expansion in certain temperature ranges. In this way, the production of the standard component and/or the compensation element from Invar can achieve a satisfactory adjustability of the temperature drift in the use temperature range.

Furthermore, the compensation element is produced at least partially or completely from Invar. This likewise has the advantage that Invar has a very small or partially negative coefficient of thermal expansion. In this way, the increase in length of the supporting chain of the coil can be influenced particularly satisfactorily.

Moreover, it is advantageous if the compensation element and/or the standard component are/is made from a material which has a coefficient of thermal expansion which is less than or equal to $10 \times 10^{-6}$ 1/K. In particular, the coefficient of thermal expansion can be less than or equal to $5 \times 10^{-1}$/K or $2 \times 10^{-6}$ 1/K. In this way, the coefficient of thermal expansion is, for example, smaller than that of iron which has a coefficient of thermal expansion of approximately $11.8 \times 10^{-6}$ 1/K. This also influences an increase in length of the supporting chain of the displacement transducer core and/or the coil, with the result that the temperature drift can be reduced.

Moreover, it can be advantageous if the compensation element has a sleeve shape. In a sleeve shape and/or else in a hollow-cylindrical shape, the compensation element can enclose the coil and/or the spring housing radially. As a result of the use of a sleeve shape which is a standard shape, it is simple to integrate the compensation element into the supporting chain of the coil, and few structural modifications are necessary, in order to mount the compensation element which encloses the coil and/or the coil housing.

Moreover, it can be advantageous if the coil housing is supported via the first housing side directly on the housing. By virtue of the fact that the coil housing is supported directly on the housing, no further modification effort of the supporting chain of the coil after the mounting is necessary. The coil always has the same position. Moreover, it can be advantageous that the coil housing is supported via the first housing side via an elastic element on the housing. Here, the elastic element is positioned between the housing and the first housing section of the coil housing. The elastic element can be a spring and/or a spacer piece and/or an expansion element and/or a disk. As a result of the use of an elastic element, the adjustable cover can be easily adjusted and/or set axially without structural modifications and without a replacement of a component, via which the coil housing is supported on the housing, since the supporting chain of the coil is positioned by way of the elastic element.

Furthermore, it can be advantageous if the adjustable cover has a pot shape, that is to say a can shape or a hollow-cylindrical shape with a bottom. As a result, it is possible that the adjustable cover encloses the coil and/or the coil housing and/or the compensation element radially, and seals and/or terminates the housing to the outside. Furthermore, it is a simple and inexpensive way to terminate and/or seal the housing to the outside and to realize a mounting capability of the displacement transducer in the housing.

Furthermore, it can be advantageous if the adjustable cover has an external thread. The housing has a corresponding internal thread, into which, in particular, the adjustable cover can be screwed. In this way, a positional change of the adjustable cover in the axial direction and/or a positional change of the compensation element and/or a positional change of the coil and/or the coil housing can be realized simply, and the length of the supporting chain of the coil can therefore be set manually in the case of a very great temperature change, and the temperature drift can therefore be reduced.

The adjustable cover advantageously protrudes somewhat out of the housing. This influences the length change of the supporting chain of the coil. The further the adjustable cover projects out of the housing, the more likely it is that the length change of the supporting chain of the coil and/or the coil housing is dependent on the material and/or the coefficient of thermal expansion of the material of the adjustable cover. In this way, a length change of the supporting chain of the coil in the case of a temperature change can also be influenced here.

The compensation element is preferably positioned radially by way of the adjustable cover or the coil housing. As a result of the positioning on components which are already present, it is particularly simple and inexpensive to position the compensation element.

It is advantageous in a further refinement that the compensation element extends, starting from the supporting face of the core housing, as far as the adjustable cover. In other words, it is advantageous if the compensation element encloses the coil and/or the coil housing substantially completely in the axial direction. The compensation element preferably projects beyond the end side of the coil and/or the coil housing in the axial direction which faces away from the valve beyond the coil and/or the coil housing, and the end side of the coil and/or the coil housing is therefore spaced apart from the adjustable cover in the direction which faces away from the valve. It is possible as a result of said arrangement that the coil and/or the coil housing can expand in the direction which faces away from the valve in the case of a temperature change, without said length change being limited by the adjustable cover.

Furthermore, it is advantageous if the adjustable cover has a supporting face on the cover bottom, which supporting face is of frustoconical configuration on the inner circumferential face and on which the compensation element is supported. In other words, the diameter of the inner circumferential face of the adjustable cover tapers on the cover bottom in the direction which faces away from the valve and configures a chamfer, which is the supporting face, between the cover bottom and the hollow-cylindrical part of the adjustable cover. This configuration is advantageous, since a length change or expansion in the radial direction of the adjustable cover is possible in this way, without a length change in the radial direction of the compensation element being necessary. The compensation element can move radially and axially on the supporting face. Furthermore, the compensation element slides further in the direction which faces away from the valve in the case of a temperature increase on the oblique plane of the frustoconical inner circumferential face. In other words, the temperature drift can likewise be set by way of the angle which the oblique plane has. The more acute the cone, the greater the displacement of the compensation element in the direction which faces away from the valve. Since the thermal expansion of the compensation element is smaller than the thermal expansion of the adjustable cover, damage and/or jamming of the displacement transducer might otherwise occur. As a result of the supporting face which is provided with an angle of attack, it is possible that the compensation element can expand in the radial direction independently of the adjustable cover without damaging something.

Furthermore, the coil encloses the displacement transducer core radially. In particular, the positions of the center of the displacement transducer core and the center of the coil coincide in the axial direction in a rest position, that is to say when the entire system is in a starting position and the valve is in the rest state. A change in the position in the axial direction of the displacement transducer core can thus be determined particularly precisely.

Furthermore, the displacement transducer is a displacement transducer which is based on the differential transformer principle, also called the LVDT (Linear Variable Differential Transformer) principle. This means that the displacement transducer has at least one primary coil and at least two secondary coils. The secondary coils are connected inversely in series, and the voltages at their connectors are therefore added. This means it is a three coil system. If the position of the center of the displacement transducer core therefore coincides with the position of the center of the three coil system, the added voltages in the two secondary coils add up to precisely zero. If the displacement transducer core is displaced axially in one direction, the voltages in the secondary coils and therefore the added voltages at the connectors change. As a result, both a change in the position, a speed of the displacement transducer core, and an absolute position of the displacement transducer core can be determined.

Furthermore, in particular, a hydraulic valve is equipped with the displacement transducer. Said hydraulic valve can be mounted, for example, in a mobile machine, in order, for example, to drive a movement of an excavator shovel. The controller can therefore be particularly accurate even in the case of great temperature fluctuations as a result of the installation of a displacement transducer according to the disclosure.

BRIEF DESCRIPTION OF THE DRAWINGS

One preferred exemplary embodiment of the disclosure will be described in greater detail in the following text using a diagrammatic drawing.

The single FIGURE shows an axial section through a 4/3-way valve which has a displacement transducer in accordance with one exemplary embodiment.

DETAILED DESCRIPTION

The FIGURE shows a directional valve 1 which has a valve slide 2. A change in a volumetric flow of a pressure medium within the directional valve 1 is controlled by way of a displacement of the valve slide 2. The directional valve 1 which is shown here has three chambers P, A and B and a T channel which is connected to a tank which is not shown here. Furthermore, the directional valve 1 has a valve housing 4. The valve slide 2 is connected on an axial end side to a magnet plunger 6 in a positively locking and/or integrally joined and/or non-positive manner. Said magnet plunger 6 projects into the valve housing 4. The magnet plunger 6 can be moved by way of an actuation of magnets 8, and the valve slide 2 can be actuated in this way, in order to control the directional valve 1. In order to determine the position of the valve slide 2 and in order to make numerical control of the directional valve 1 possible, it is necessary that the precise position and/or the speed of the valve slide 2 are/is known. To this end, the magnet plunger 6 is arranged on an axial end side which faces away from the valve slide 2 on a core rod 10 of a displacement transducer 12. The displacement transducer 12 and the actuating apparatus 14, having the magnet plunger 6 and the magnets 8, can be arranged in a common housing 16 which axially adjoins the valve housing 4. The displacement transducer 12 is arranged in a cutout of the housing 16. The displacement transducer 12 has a displacement transducer core 18 which is attached to the core rod 10. The displacement transducer core 18 is ferromagnetic, in order that, in the case of movement, it can induce a voltage in coils 20 which enclose the displacement transducer core 18 radially. The coils 20 have a hollow-cylindrical shape, in which the displacement transducer core 18 is arranged. The coils 20 can be arranged in a ferromagnetic coil housing 22 which in turn surrounds the coils 20 radially. The closed coil housing 22 has a pot shape, the bottom 24 of the pot being arranged on the side which faces the valve. The bottom 24 has a first housing side 26 which is arranged on that side of the bottom 24 which faces the valve. Via said first housing side 26, the coil housing 22 is supported via a spring 28 on the housing 16. Furthermore, the coil housing 22 is secured radially against rotation by way of a pin 30 which is arranged partially in the housing 16 and partially in a projection 32 of the coil housing 22. The projection 32 has a can shape and is arranged in the outer radial region of the bottom 24 of the coil housing 22. The projection 32 projects axially from the bottom 24 of the coil housing 22 in a direction which faces the valve. Furthermore, the bottom 24 of the coil housing 22 is widened somewhat radially. This means that the diameter of the bottom 24 of the coil housing 22 is somewhat greater than the diameter of that section of the coil housing 22 which surrounds the coil 20 radially. In this way, a supporting face 34 is formed on that side of the bottom 24 of the coil housing 22 which faces away from the valve. The compensation element 36 bears axially against said supporting face 34. In other words, the compensation element 36 is pushed over the coil housing 22 and surrounds the coil housing 22 and the coils 20 radially. Here, the compensation element 36 has a sleeve shape. The compensation element 36 is surrounded radially on the outside by an adjustable cover 38. The latter has a pot shape. Here, the bottom of the adjustable cover 38 terminates the housing 16. Furthermore, the adjustable cover 38 has an external thread 40 which can be introduced into an internal thread 42 of the housing 16. In this way, the adjustable cover 38 and therefore also the coil 20 can be displaced radially by way of the adjustable cover 38 being screwed in or screwed out. In the case of the adjustable cover 38 being screwed into the housing 16, the spring 28, on which the coil housing 22 is supported, is compressed, and the spring 28 positions the coil housing 22 axially. Furthermore, the adjustable cover 38 has a supporting face 44, on which the compensation element 36 is supported. The supporting face 44 has an angle of attack and is of frustoconical configuration. The supporting face 44 tapers axially in the direction of the side which faces away from the valve. In other words, the compensation element 36 bears with an angle against the supporting face 44, in order to make an expansion of the compensation element 36 and the adjustable cover 38 in the radial direction possible.

The adjustable cover 38 is secured by way of a lock nut 46.

A displacement transducer for a valve in a housing is disclosed, which displacement transducer has a cylindrical displacement transducer core which is enclosed radially by at least one coil which is arranged in a coil housing. The coil housing is supported axially on a side which faces the valve via a first housing side on the housing, and the coil housing is supported axially on a compensation element via a supporting face of the coil housing which is arranged between the first housing side in an axial end side which faces away from the valve, with the result that the length change of the coil is not limited in the axial direction which faces away from the valve.

The compensation element is supported on the side which faces away from the valve on an adjustable cover; or a standard component of the supporting chain of the displacement transducer core and/or the supporting chain of the coil is replaced by a component made from a material with a suitable coefficient of thermal expansion.

LIST OF REFERENCE NUMERALS

1 Directional valve
2 Valve slide
4 Valve housing
6 Magnetic plunger
8 Magnet
10 Core rod
12 Displacement transducer
14 Actuating apparatus
16 Housing
18 Displacement transducer core
20 Coil
22 Coil housing
24 Bottom
26 First housing side
28 Spring
30 Pin
32 Protrusion
34, 44 Supporting face 36 Compensation element
38 Adjustable cover
40 External thread
42 Internal thread
46 Lock nut

What is claimed is:

1. A displacement transducer for a valve, comprising:
a transducer housing;
a transducer core positioned in the transducer housing and configured to connect to a valve slide of the valve;
a coil housing including:
a first housing side that, in an assembled state, faces toward the valve slide, wherein the coil housing is supported on the transducer housing via the first housing side; and
a supporting face that, in the assembled state, faces away from the valve slide;
at least one coil positioned in the coil housing, assigned to the transducer core, and including an end section that, in the assembled state, extends away from the valve slide;
wherein the supporting face of the coil housing is spaced apart in an axial direction from the end section of the at least one coil;
wherein the at least one coil and/or the coil housing is configured such that thermal expansion of the at least one coil and/or the coil housing from the supporting face of the coil housing is not constrained in a direction that faces away from the valve slide; and
wherein the coil housing is supported, via the supporting face, by one or more of (i) a compensation element on an adjustable cover of the transducer housing, (ii) at least one standard component of a supporting chain of the at least one coil, the at least one standard component having a relatively small coefficient of thermal expansion, and (iii) a supporting chain of the transducer core.

2. The displacement transducer of claim 1, wherein:
the coil housing is supported by the compensation element; and
the compensation element has a relatively small coefficient of thermal expansion.

3. The displacement transducer of claim 2, wherein the coefficient of thermal expansion of the compensation element is less than 100% of a coefficient of thermal expansion of a component having a next smallest coefficient of thermal expansion in the supporting chain of the coil.

4. The displacement transducer of claim 1, wherein:
the coil housing is supported by the standard element in the supporting chain of the coil; and
wherein the coefficient of thermal expansion of the standard element is less than 100% of a coefficient of thermal expansion of a component having a next smallest coefficient of thermal expansion of in either the supporting chain of the displacement transducer or the supporting chain of the at least one coil.

5. The displacement transducer of claim 1, wherein the compensation element has a sleeve-like shape and encloses the at least one coil.

6. The displacement transducer of claim 1, wherein the compensation element is positioned radially via one or more of the adjustable cover and the coil housing.

7. The displacement transducer of claim 1, wherein the compensation element extends from the supporting face of the coil housing to beyond the at least one coil and as far as a cover bottom of the adjustable cover.

8. The displacement transducer of claim 1, wherein the adjustable cover includes a frustoconical supporting face that supports the compensation element.

9. The displacement transducer of claim 1, wherein the adjustable cover has a pot-like shape having an opening that, in the assembled state, faces toward the valve slide.

10. The displacement transducer of claim 1, wherein:
the transducer housing has an internal thread; and
the adjustable cover has an external thread corresponding to and screwed into the internal thread of the transducer housing.

11. The displacement transducer of claim 1, wherein the adjustable cover protrudes from the transducer housing.

12. The displacement transducer of claim 1, wherein the compensation element is formed at least partially or completely from Invar.

13. The displacement transducer of claim 1, wherein the standard component is formed at least partially or completely from Invar.

14. The displacement transducer of claim 1, wherein one or more of the compensation element and the standard component has a coefficient of thermal expansion that is less than or equal to $10 \times 10^{-6}$ 1/K.

15. A valve, comprising:
a valve slide; and
a displacement transducer, including:
a transducer housing;
a transducer core positioned in the transducer housing and connected to the valve slide;
a coil housing including:
a first housing side facing toward the valve slide, wherein the coil housing is supported on the transducer housing via the first housing side; and
a supporting face facing away from the valve slide;
at least one coil positioned in the coil housing, assigned to the transducer core, and including an end section that extends away from the valve slide;
wherein the supporting face of the coil housing is spaced apart in an axial direction from the end section of the at least one coil;
wherein the at least one coil and/or the coil housing is configured such that thermal expansion of the at least one coil and/or the coil housing from the supporting face of the coil housing is not constrained in a direction that faces away from the valve slide; and
wherein the coil housing is supported, via the supporting face, by one or more of (i) a compensation element on an adjustable cover of the transducer housing, (ii) at least one standard component of a supporting chain of the at least one coil, the at least one standard component having a relatively small coefficient of thermal expansion, and (iii) a supporting chain of the transducer core.

* * * * *